Figure 1:
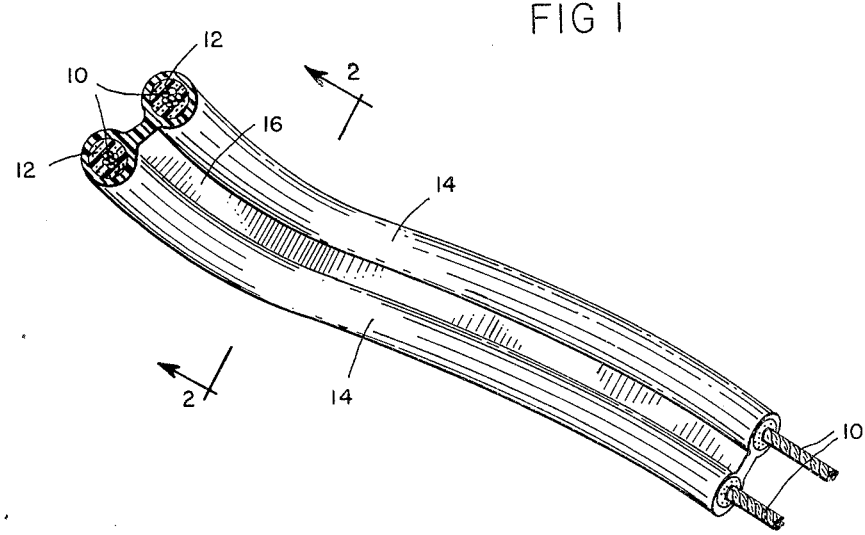

Nov. 23, 1965   L. A. HARRIS   3,219,752
HIGH FREQUENCY ELECTRICAL LEAD-IN CABLE
Filed Feb. 17, 1965

INVENTOR
LEON A. HARRIS
BY
ATT'Y.

3,219,752
**HIGH FREQUENCY ELECTRICAL
LEAD-IN CABLE**
Leon A. Harris, Chicago, Ill., assignor to Columbia Wire
and Supply Company, Chicago, Ill., a corporation of
Illinois
Filed Feb. 17, 1965, Ser. No. 433,444
1 Claim. (Cl. 174—117)

The present invention relates generally to electrical cables for the conduction of high frequency electrical energy and has particular reference to a duplex lead-in cable for television service involving very high and ultra high frequency signals ranging from approximately 30 to 3000 megacycles.

The improved electrical cable of the present invention involves in its general organization a pair of parallel slightly spaced metallic conductors, each conductor being preferably in the form of stranded copper filaments individually embedded in a flexible core which is made of dielectric polyethylene foam or similar plastic foam material and serves to support the associated conductor substantially throughout its entire length. Such dielectric material is of a cellular nature throughout its mass and embodies a multiplicity of minute occluded air cells which are completely separated from one another by intervening, fluid impervious, polyethylene walls. Each core of polyethylene foam is itself encased in an outer tubular casing or jacket of solid high density polyethylene or similar plastic material, the two casings or jackets being connected to the opposite side edges of an elongated flat intervening web which is formed of the same material as the jackets and is of appreciably less thickness than the diameter of the two jackets.

By reason of the cellular structure of the two cores, the over-all density of these cores is at least 40% less than that of the material of which the jackets and the web are formed and, therefore, the dielectric properties of the cores, considered individually, are superior to those possessed when a metallic conductor is encased in solid dielectric material such as polyethylene. A reduction in the over-all weight of the cable also is attained.

The outer tubular jackets of the cable, being of a dense nature and impervious to moisture, either in the liquid, vapor or gaseous state, insure against seepage of moisture into contact with the stranded copper wire conductors. In instances where perforations, fractures, or localized cracks develop in the outer tubular jackets, the cellular structure of the jacket-encased cores prevents moisture from reaching the conductors which are encased by such cores.

Due to the extreme flexibility and compressibility of the two cores which immediately surround the metallic conductors, the cable as a whole offers but little resistance to bending or flexing. A right angle bend in the cable does not require right angle bends in the two conductors. It is customary, where a transmission cable passes near a metal object, to twist the cable and thus alternately transpose the conductors. The present cable is readily susceptible to such twisting without difficulty since the cellular polyethylene cores offer little resistance to deformation.

When installing a twin or duplex lead-in cable, it invariably is necessary to separate and expose the end portions of the individual metallic conductors so that they may be electrically connected to the antenna and the television receiver. The duplex lead-in cable of the present invention is readily divisible for this purpose, it being merely necessary to slit the web of the cable and trim away the end portions of the two polyethylene foam cores and their respective outer jackets, together with the adjacent slitted portions of the web.

Insofar as the electrical properties of the present duplex lead-in cable are concerned, the use of two cellular cores as briefly outlined above contributes toward the maintenance of a substantially constant impedance regardless of changes in ambient conditions. Furthermore, the use of such cellular cores spaces the conductors an appreciable distance from such objects as may come into contact with the cable so that the capacitive coupling of the conductors with respect to ground is small.

Finally, an advantageous feature of the present duplex lead-in cable, that is, a feature which is made possible by the use of the two side-by-side but spaced apart cellular polyethylene cores, resides in the ability of the cable to resist crushing when clamped in position. Whereas, in connection with the use of solid polyethylene sheathing, there is a tendency for the material to shear when subjected to extreme clamping pressure, the present cable is susceptible to considerable compressional forces before shearing will take place.

The provision of a low-loss, low-capacitance, duplex lead-in cable which is suitable for high frequency use, such as UHF, VHF, FM and color television lead-in service and possesses the heretofore mentioned advantageous features, being the principal object of the present invention, other objects and advantageous will readily suggest themselves as the following description ensues.

In the accompanying single sheet of drawings forming a part of this specification, one illustrative embodiment of the invention is shown.

Figure 2:
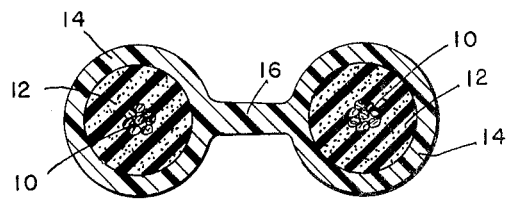

In these drawings:

FIG. 1 is a perspective view of a short length of a duplex lead-in cable embodying the present invention; and FIG. 2 is an enlarged sectional view taken transversely through the cable of FIG. 1 and on the line 2—2 of the last-mentioned figure.

Referring now to the drawings in detail, the high frequency cable of the present invention, in the illustrative embodiment that is shown in FIGS. 1 and 2, is adapted for use as a television lead-in cable. This cable is a duplex cable and comprises a pair of stranded copper wire conductors 10. The latter are arranged in spaced parallel relation, and each conductor is embedded in a mass of polyethylene foam, the mass being in the form of a sheath or core 12 which is of cylindrical design and, as shown in the drawings, is substantially coextensive with the associated conductor. The cores 12 are of an insulating nature and contain a multiplicity of small occluded gas cells. It is essential that these cells be of an occluded cellular nature as distinguished from spongy cells which are interconnected. The cellular structure of each core is such that the individual cells are separated from adjacent cells by fluid impervious polyethylene walls. The cellular structure for the two cores 12 is incapable of absorbing moisture since such moisture may not enter any individual cell other than such cells as may open outwardly at the outer surfaces of the cores. Cellular insulation of the herein employed type possesses excellent dielectric properties, even when exposed to moisture whereas a similar mass of spongy cellular insulation has little dielectric value when wet.

The volume of the occluded cells in the two cores 12 may vary within certain limits. The less the bulk density of each core 12, the greater will be its dielectric constant. However, for practical considerations, a bulk density which is less than 75% of the mass density of solid polyethylene will not offer adequate support to the conductor which is embedded therein and the core will be susceptible to crushing and disintegration. An ideal bulk density for the purposes intended is on the order of 40% less than that of solid polyethylene.

Each of the two cellular cores 12 is provided with an outer imperforate tubular jacket 14 of solid polyethylene, each jacket preferably being cylindrical. The two jackets 14 are interconnected by a flat web 16 which is formed of solid polyethylene, is integral with the jackets 14, and is joined thereto along its side edges. The web 16 constitutes a spacer for maintaining the conductors 10 and their surrounding cores 12 and the jackets 14 spaced apart in their parallel relationship. The thickness of the web 16 is not critical, but preferably is at least as thick as the radial thickness of the jackets 14.

The jackets 14, in effect, provide a skin which closes any surface pores in the polyethylene foam cores 12 and prevents the accumulation on these cores of deposits which, otherwise, might impair the dielectric properties of the cores or affect the capacitance between the conductors 10. The radial extent or thickness of each outer jacket 14 is of appreciable extent, the cellular polyethylene core within the same supplying an appreciable portion of this radial extent. Thus, when the cable is used out of doors and the jackets acquire a grounded deposit of moisture or other conductive foreign material, the capacitive coupling between the centrally located conductors 10 to ground is maintained at a minimum.

In view of the fact that the solid polyethylene jackets 14, the solid polyethylene web 16, and the cellular polyethylene cores 12 are relatively soft and susceptible to cutting or slicing, it is a comparatively easy matter to bare the two conductors 10 for the purpose of making electrical connections by simply cutting away the insulating materials involved. It is not necessary to take special precautions to seal the cut ends of the cable since the cellular cores 12 are impervious to moisture in all directions, i.e., endwise as well as radially.

A duplex lead-in cable embodying the present invention and as described above is extremely light in weight and may be manufactured in an extremely long length by high-speed extrusion equipment. It is extremely flexible and may be bent along curves of short radius without damaging either the conductors 10 or the surrounding or adjacent insulation. With a proper selection of bulk density for the cores 12, a cable is provided which may be tightly clamped without danger of crushing of the walls which intervene between adjacent occluded cells of the polyethylene foam material. The gaseous content of the cells may be compressed somewhat, but the cells themselves are not damaged. Ease of separation or divisibility of the cable longitudinally by slicing the web 16 centrally thereof is another feature of the present invention and it greatly enhances the ease of installing the cable. Because of the flatness of the cable, installation of the cable under baseboards, moldings and the like is greatly facilitated.

The invention is not to be limited to the exact arrangement of parts shown in the accompanying drawings or described in this specification as various changes in the details of construction and in the proportion of the parts may be resorted to without departing from the spirit or scope of the invention. Therefore, only insofar as the invention has been particularly pointed out in the accompanying claim is the same to be limited.

Having thus described the invention what I claim as new and desire to secure by Letters Patent is:

A duplex electrical cable designed primarily for the transmission of high frequency electrical energy in connection with television service and comprising a pair of parallel spaced apart stranded copper wire conductors, a substantially cylindrical core of polyethylene foam insulating material surrounding each of said conductors coextensively and in intimate contact therewith, said material containing a large multiplicity of individual cells which are separated from adjacent cells by impervious polyethylene walls so that moisture may not enter the cells other than the partial cells which are intersected by the outer cylindrical surfaces of the cores, said material possessing a bulk density which is less than 75% of the mass density of the solid polyethylene from which the polyethylene foam is formed, an imperforate cylindrical tubular jacket of solid polyethylene material surrounding each of said cores coextensively and in intimate contact therewith, the inner cylindrical surface of said tubular jacket serving to seal off said partial cells at the outer cylindrical surface of the encompassed core, the combined radial thickness of each jacket and its associated core being of appreciable extent to the end that acquired grounded deposits of moisture or other conductive foreign material on the surfaces of the jackets will not establish an appreciable conductor-to-ground capacitive coupling, and a flat web of solid polyethylene material formed integrally with said jackets, extending therebetween, and serving to spaced said jackets from each other, the thickness of said web in a direction normal to the common plane of said conductors being substantially equal to the radial thickness of said jackets and also being of such a dimension that the cable as a whole may be bent along curves of short radius without damaging the conductors, the surrounding cores or the tubular jackets.

References Cited by the Examiner

UNITED STATES PATENTS

| | | | |
|---|---|---|---|
| 2,666,093 | 1/1954 | Wildberg | 174—113 X |
| 2,782,251 | 2/1957 | Ebel et al. | |
| 3,013,109 | 12/1961 | Gorman et al. | 174—27 X |
| 3,134,845 | 5/1964 | George | 174—117 |

FOREIGN PATENTS 575,660  2/1946  Great Britain.

ROBERT K. SCHAEFER, *Primary Examiner.*

E. JAMES SAX, *Examiner.*

DONALD A. KETTLESTRINGS, *Assistant Examiner.*